United States Patent [19]

Ahuja

[11] 4,309,578
[45] Jan. 5, 1982

[54] TELEPHONE RINGER LOAD SIMULATOR

[75] Inventor: Om P. Ahuja, East Meadow, N.Y.

[73] Assignee: Porta Systems Corp., Syosset, N.Y.

[21] Appl. No.: 157,507

[22] Filed: Jun. 9, 1980

[51] Int. Cl.³ .......................... H04B 3/46; H04M 3/00
[52] U.S. Cl. ........................... 179/175.2 B; 179/84 L; 179/175
[58] Field of Search .............. 179/175.2 B, 2 A, 84 R, 179/84 C, 84 L, 175, 1 PC, 184, 186, 175.2 R, 175.3 R, 175.2 C, 190

[56] References Cited

U.S. PATENT DOCUMENTS 3,459,900  8/1969  Alster et al. ....................... 179/84 L
3,814,870  6/1974  Miller ............................. 179/175.3 R
3,983,338  9/1976  Mathauser ........................... 179/175

Primary Examiner—Thomas A. Robinson
Attorney, Agent, or Firm—Charles E. Temko

[57] ABSTRACT

A module incorporating a single conductive line having in series a high resistance and a gas tube arcing device. The module includes means for interconnecting the same across the tip and ring circuits at a building entrance terminal to place on the line the equivalent of approximately ten percent of a normal alternating current ringer load. In the absence of a connected telephone set on the premises, the phantom ringer operates at 100 volts peak, and cuts off at 60 volts peak. Thus it poses no load during normal on hook and off hook operating conditions.

3 Claims, 2 Drawing Figures

TELEPHONE RINGER LOAD SIMULATOR

BACKGROUND OF THE INVENTION

This invention relates generally to the field of telephony, and more particularly to a device for simulating the presence of a connected telephone set for test purposes.

In the past several decades, there has been a substantial increase in the number of residential units employing a plurality of wall jacks selectively connectible to one or more plugs fitted to movable telephone sets. Even when a residence is provided with only a single telephone instrument, the convenience of being able to move the same for operative connection in selected areas is substantial.

As long as a single telephone set remains connected to the individual subscriber line, it is possible to test the line for most purposes from the telephone office. If no set is connected, only capacitance tests may be performed, which are not entirely satisfactory to show all of the existing conditions.

It is known in the prior art to provide an additional ringer box which remains permanently interconnected to the subscriber line, the same being placed at a convenient centrally positioned location in the residence. This ringer box will function in the event that no telephone set is connected to a wall jack. Unfortunately, the cost of a ringer box is not inconsiderable, and it adds significantly to the cost of an individual new installation.

SUMMARY OF THE INVENTION

Briefly stated, the invention contemplates the provision of an improved module which may be manufactured at a cost which is a mere fraction of the cost of a conventional ringer box. It includes a pair of elongated contact members having means at exposed ends thereof for the interconnection with the tip and ring connections at a building entrance terminal. The module includes a single conductive line between the terminals having in series therewith a high resistance and a known gas tube conductor. The resistance is substantially higher than that provided by a ringer box, to provide approximately one tenth of normal alternating current ringer load on the line. The gas tube conducts at slightly below ringing voltage, and becomes non-conductive at a voltage level far above the normal tip voltage, so that it imposes no load during normal operating conditions.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
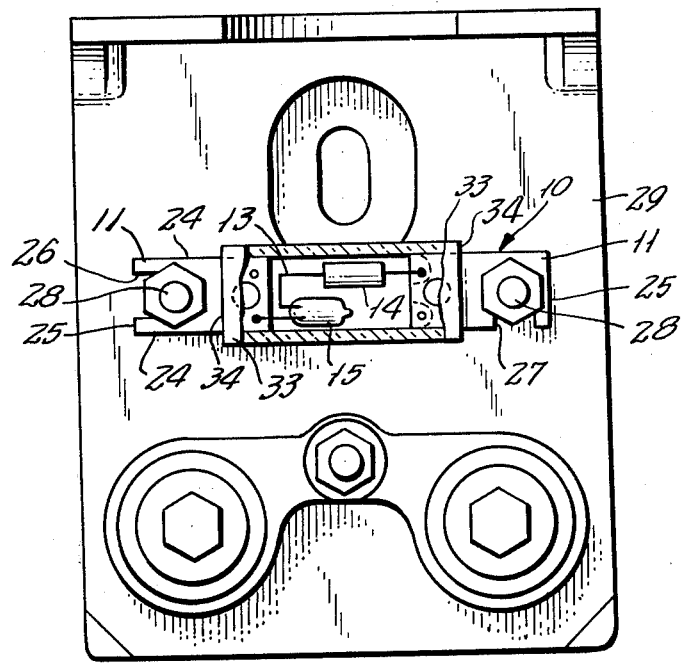
FIG. 1 is a perspective view of an embodiment of the invention, in installed condition.
Figure 2:
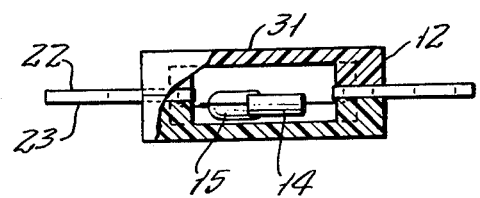
FIG. 2 is a side elevational view thereof in detached condition.

In accordance with the invention, the device, generally indicated by reference character 10, comprises broadly: terminal members 11, a cover element 12, a conductive line 13, a resistor 14, and a gas tube discharge element 15 in series with line 13.

The terminal members 11 may be in the form of flat stampings of metal, and each is bounded by an upper surface 22, a lower surface 23, longitudinal edges 24, end edges 25, and first and second slotted openings 26 and 27 in the conductive stampings which are selectively engageable upon the threaded studs 28 of a building entrance terminal 29, of known type. The conductive line 13 may be an individual conductor, or part of a printed circuit communicating with the slotted openings 26 and 27.

The resistor 14 may be of any suitable type, and has an effective resistance of approximately 68,000 ohms, in order to provide, when operative, a ringer load of approximately 10 percent of that obtained when using a normal ringer box. The gas tube element 15 may be one of a type commonly used in the telephone industry as an arcing device in telephone protector modules.

Enclosing the resistor 14 and gas tube element 15 is the cover element 12 which may be of suitable translucent or transparent synthetic resinous materials. It includes an upper wall 31 through which operation of the gas tube element 15 may be observed, side walls 33, and end walls 34.

During normal operation of the circuit, because of the high resistance of the device, no perceptible effect is present on the line. When a normal test instituted from the telephone office is made by impressing a ringing voltage, should an actual ringer be in operation, the test may be made by measuring the current flow. This will indicate not only the presence of the ringer box, but the number of ringer boxes in operation on the same subscriber line. If no actual ringer box is in operation, the high resistance provided by the device will indicate a much lower current flow, indicating that only the device itself is in operation. Should no current flow be detected, an indication is made that the problem is due to a failure of the subscriber line at a point outside the residence, and suitable service personnel may be dispatched to rectify the condition.

It will be observed that the device may be manufactured at very low cost to dimensions which are no greater than a few inches in length, and of very light weight, thus permitting a supply of the same to accompany service personnel during service calls. It may be installed at the time of initial installation of the subscriber line, or during a subsequent service call, without difficulty.

I wish it to be understood that I do not consider the invention limited to the precise details of structure shown and set forth in this specification, for obvious modifications will occur to those skilled in the art to which the invention pertains.

I claim:

1. As a new article of manufacture, a telephone ringer load simulator for use in conducting tests of the condition of an individual subscriber circuit instituted from a telephone office comprising: a pair of terminal members of generally elongated configuration and having a means on each of two opposite ends thereof for the engagement upon a corresponding pair of connections on an existing building entrance terminal; a single conductor interconnecting said means to provide a short of the circuit at said building entrance terminal; a resistor and an avalanche discharge device in series with said single conductor, said resistor having an effective resistance value equivalent to a fractional multiple of the resistance provided by an actual ringer, said discharge device being conductive at a voltage slightly below normal ringing voltage, and having a cutoff voltage at a value substantially above normal tip voltage; whereby said telephone ringer load simulator imposes substantially no load upon the subscriber circuit during normal operating conditions, and provides a sufficient ringing load to permit current measurement.

2. The article as set forth in claim 1, further characterized in said avalanche discharge device comprising a gaseous discharge tube.

3. The article as set forth in claim 2, further characterized in said resistor and gas discharge tube being mounted within a transparent cover element through which operation of said gas tube may be observed.

* * * * *